United States Patent [19]

Eaton

[11] Patent Number: 4,736,289

[45] Date of Patent: Apr. 5, 1988

[54] MICROPROGRAM CONTROLLED DATA PROCESSING APPARATUS

[75] Inventor: John R. Eaton, Salford, United Kingdom

[73] Assignee: STC PLC, London, England

[21] Appl. No.: 822,804

[22] Filed: Jan. 27, 1986

[30] Foreign Application Priority Data

Mar. 23, 1985 [GB] United Kingdom ............... 8507610

[51] Int. Cl.⁴ .............................................. G06F 9/22
[52] U.S. Cl. .................................................. 364/200
[58] Field of Search ... 364/200 MS File, 900 MS File

[56] References Cited

U.S. PATENT DOCUMENTS 4,179,737 12/1979 Kim ..................................... 364/200

Primary Examiner—Raulfe B. Zache
Attorney, Agent, or Firm—Lee, Smith & Zickert

[57] ABSTRACT

A microprogrammed processor in which instructions have alternative fast and slow microprogram sequences. The fast sequences are designed for speed, and can detect exception conditions but do not resolve them. The slow sequences perform all the necessary tests to resolve these conditions. When a fast sequence detects an exception, that sequence is abandoned, and the corresponding slow sequence is run.

9 Claims, 4 Drawing Sheets

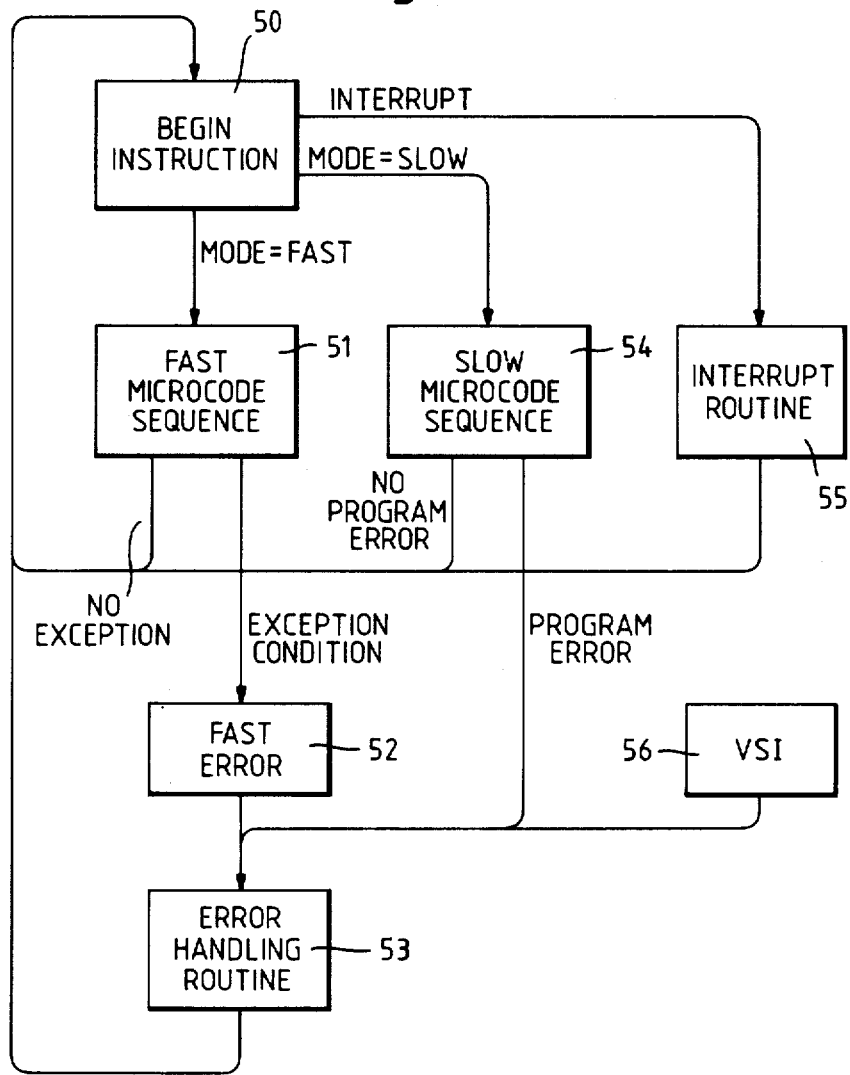

MICROPROGRAM CONTROLLED DATA PROCESSING APPARATUS

This invention relates to data processing apparatus in which machine-level instructions are executed by sequences of microinstructions.

During operation of the processing apparatus, certain exception conditions may occur, for example as the result of a program error. For example, an instruction may attempt to access a region of store which is currently forbidden or unavailable. The microprogram may be arranged to detect these exceptions and to resolve them i.e. to determine the exact cause of the exception and to initiate the appropriate corrective action (or, if corrective action is not possible, at least to inform the operator of the nature of the exception). However, this tends to increase the lengths of the sequences of microinstructions and hence slows down the rate of execution of the machine-level instructions.

The object of the invention is to alleviate this problem.

SUMMARY OF THE INVENTION

According to the invention, there is provided data processing apparatus comprising:

(a) a microprogram store,
(b) execution means for executing machine-level instructions by means of sequences of microinstructions held in the microprogram store, at least some of the machine-level instructions having alternative fast and slow microprogram sequences, the fast sequences being effective to detect exception conditions without resolving them and the slow sequences being effective both to detect and to resolve exception conditions,
(c) mode selection means for selecting either a fast mode or a slow mode,
(d) means responsive to the mode selection means for selecting a fast microprogram sequence to execute a machine-level instruction when the fast mode is selected, and for selecting the alternative slow microprogram sequence when the slow mode is selected,
(e) means operative upon detection of an exception condition during a fast sequence, for causing the machine-level instruction currently being executed to be abandoned, the mode selection means to be set to select the slow mode, and the machine-level instruction then to be re-started, and
(f) means operative upon completion of a slow sequence, for setting the mode selection means to select the fast mode.

Thus, it can be seen that the invention avoids the problem referred to above by having a fast mode and a slow mode. Normally, machine-level instructions are executed by the fast microprogram sequences. Because these fast sequences are not constrained by the requirement of resolving exception conditions, they can be made very short and hence very fast. When an exception condition is detected, the instruction in question is re-tried using the corresponding slow microprogram sequence, which resolves the exception condition. The slower speed of this sequence does not have a significant effect on the performance of the processing apparatus, since exception conditions are, in general, a comparatively rare occurrence.

Another advantage of having fast and slow modes is that the two modes in general perform the required operations by different routes, using different hardware. Thus, if an instruction fails in fast mode because of a hardware fault, it may still be able to be executed in the slow mode. This increases the resilience of the system.

BRIEF DESCRIPTION OF THE DRAWINGS

One data processor in accordance with the invention will now be described by way of example with reference to the accompanying drawings.

FIG. 5 is a flow-chart summarizing the operation of the microprogram.

DESCRIPTION OF AN EMBODIMENT OF THE INVENTION

Figure 1:
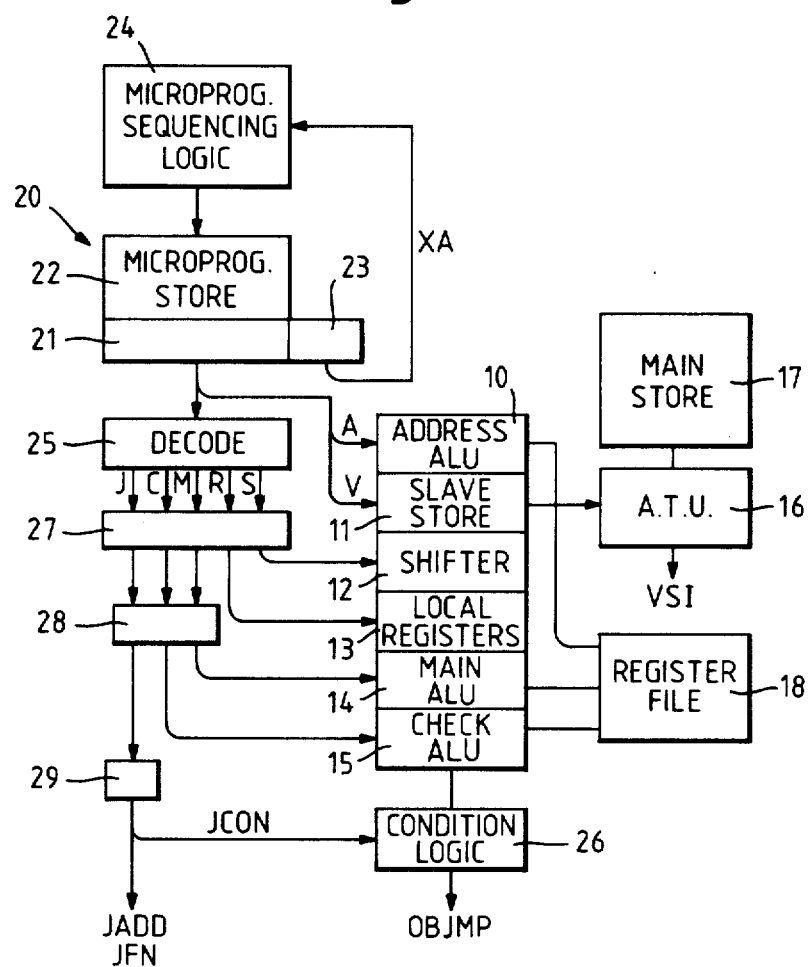
FIG. 1 is a block diagram of the processor.

Referring to FIG. 1, the processor comprises a plurality of functional units including an address arithmetic and logic unit (ALU) 10, a slave store 11, a shifter 12, local registers 13, a main ALU 14, and a check ALU 15.

The address ALU 10 performs arithmetic operations for generating addresses, such as adding a displacement value to a base register.

The slave store 11 acts as a fast access buffer holding copies of operands, instructions and addresses currently in use by the processor. It is addressed by the output of the address ALU 10. If the required data is not present in the slave store, the address (which is a virtual address) is translated by an address translation unit (ATU) 16 to form a real address. This is then applied to a main store 17 so as to fetch the desired data into the slave. If the address translation fails, because the ATU does not hold the necessary information for the translation, an interrupt signal, referred to as a virtual store interrupt VSI, may be generated and this initiates a special program to update the information held in the ATU. The combination of a slave store, main store and ATU is well known and so will not be described in further detail.

The shifter 12 performs shift operations on operands and addresses, or can act merely as a buffer between the slave store and the main ALU 14 and check ALU 15. The local registers 13 hold various items of data, including back-up copies of the contents of various registers in the processor. These can be used for restoring the processor to a consistent state where execution of an instruction has been abandoned.

The main ALU 14 performs the main arithmetic and logical operations for the processor, while the check ALU 15 is used to perform certain operational checks to detect exception conditions. For example, the check ALU can be used to test whether the address from the address ALU is greater than a specified limit.

The address ALU, main ALU, and check ALU share access to a register file 18 which contains the main registers of the processor. These registers include, for example, an accumulator register ACC, a descriptor register DR, a local name base register LNB, and a stack front register SF.

Operation of the processor is controlled by a microprogram store 20, having 16K (=16384) individually addressable locations, each capable of holding a microinstruction. The first 4K locations are referred to as the lower microprogram store 21, and the remaining locations as the upper microprogram store 22. Each microinstruction in the lower microprogram store has an extension, held in an area referred to as the lower microprogram store extension 23.

Machine-level instructions in the processor are executed by sequences of microinstructions. The first microinstruction in each sequence is always in the lower microprogram store 21, and the extension of that instruction contains a jump address XA pointing to the second microinstruction in the sequence, which will normally be in the upper microprogram store 22. Addressing of the microinstructions in the upper microprogram store is sequential.

The addresses for the microprogram store are generated by microprogram sequencing logic 24 which is described in more detail below with reference to FIG. 2.

Each microinstruction read out of the store 20 directly provides control signals A and V for the address ALU and the slave store. The microinstruction is also decoded by a decoder 25 to produce control signals S, R, M and C for the shifter, local registers, main ALU and check ALU. The decoder 25 also produces a jump control signal J and further miscellaneous control signals (not shown) for setting various status registers. One of these status registers contains a mode bit, to be described below, which specifies either a fast or slow mode of operation.

It will be appreciated that each of the control signals A,V,S etc. consists of a plurality of bits for specifying the operation of the functional unit in question. For example, the control signal M consists of the following control fields:
- (a) A function control field specifying the operation (add, subtract etc) to be performed by the main ALU.
- (b) An operand select field specifying the sources of the operands for the main ALU. These sources may be, for example, the register file 18, the output of the slave store 11, or the output of the address ALU 10.
- (c) A register file address, which selects a location in the register file 18 for use by the main ALU, if required.

The jump control J consists of the following control fields:
JCON: This is a jump condition, which controls a condition logic circuit 26, so as to select a particular bit as the criterion for performing a jump. For example, this bit may be the carry bit from the check ALU 15, so that the jump will be obeyed if this carry output equals one. The condition logic 26 produces an output signal OBJMP if the selected condition is satisfied, to indicate that the jump should be obeyed.
JADD: This specifies the destination address of the jump.
JFN: This specifies the type of jump, e.g. absolute or relative. An absolute jump (JFN=1) means that the jump address JADD is the actual address, in the microprogram store, of the jump destination. A relative jump (JFN=0) means that JADD has to be added to the current microprogram address to produce the actual jump destination.

A relative jump with zero address (which would otherwise be meaningless) is used to specify a special jump GFE (go to fast error routine). The purpose of this jump will be described below.

In total, there are 180 control bits forming the various control signals for the processor. These bits are compressed into a 32-bit microinstruction format by some suitable compression scheme such as that described in our co-pending European Patent Application No. 85 30 0459. As a result, only 32 control bits out of 180 can be specified by a single microinstruction, the remaining bits are given a predetermined default value, e.g. zero. Thus, a given microinstruction cannot specify control signals for all the functional units, but only for a sub-set of them. In particular, a long jump address field JADD occupies 28 bits of the microinstruction and this restricts the number of other control signals which can be specified by that microinstruction. In contrast, the GFE jump referred to above occupies only 4 bits, since it has a zero jump address and jump function code.

PIPELINE OPERATION

The control signals A and V are applied directly to the address ALU and slave store. The control signals S and R are delayed by one clock beat in a pipeline register 27, and then fed to the shifter and local registers. The control signals M and C are delayed by two clock beats in pipeline registers 27 and 28, and then applied to the main and check ALU. The jump control signal J passes through three pipeline registers 27,28 and 29 and hence becomes active three beats after the initial decoding of the microinstruction.

Thus, it can be seen that each microinstruction is fetched and executed in a six-stage pipeline structure, in six clock beats, as follows.
Stage 1: The address of the next microinstruction is generated by the sequencing logic 24.
Stage 2: The microprogram store 20 is accessed to read out the microinstruction.
Stage 3: The instruction is decoded in the decoder 25. At the same time, the control siqnals A and V are applied to the address ALU and slave store, so as to cause the address ALU to operate and to set up the controls for the slave store.
Stage 4: The shifter and local registers operate at this stage, and the slave store is read.
Stage 5: The main and check ALUs operate at this stage, and writes to the slave store are performed.
Stage 6: The jump controls operate at this stage, and writes to the register file 18 and local registers 13 are performed.

The last microinstruction in each sequence also passes through a seventh stage, in which the values of the registers are written into a register archive.

The fetching and execution of successive microinstructions are overlapped in the pipeline so that up to six microinstructions may be active in the processor at the same time. pipelined processors are well known in the art and so it is not necessary to describe the pipeline structure in greater detail.

MICROPROGRAM SEQUENCING LOGIC

Figure 2:
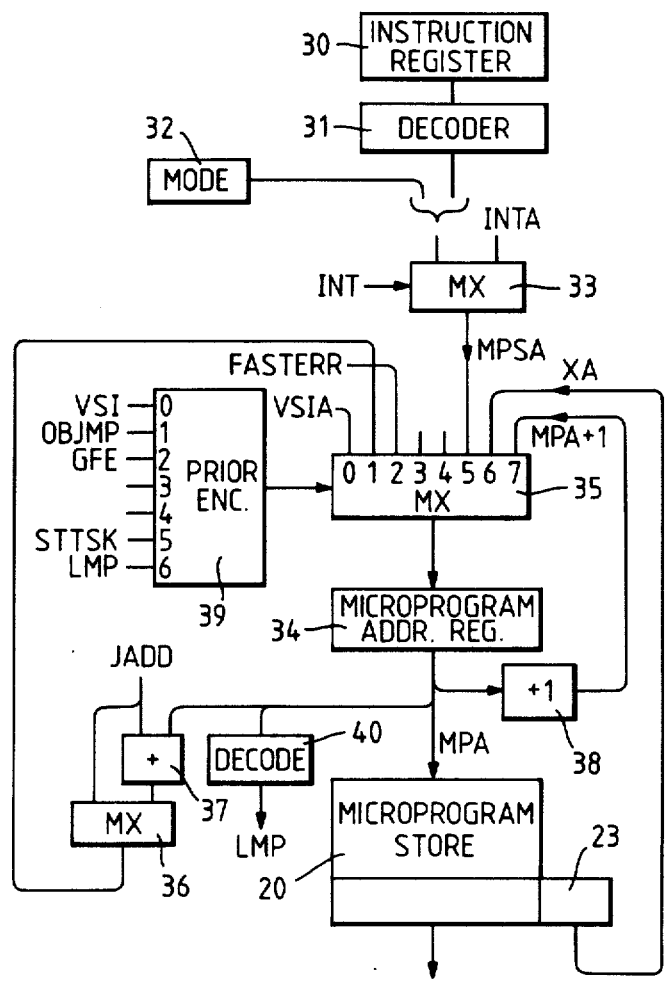
FIG. 2 is a diagram of microprogram sequencing logic forming part of the processor.

FIG. 2 shows the microprogram sequencing logic 24 in detail. This logic includes an instruction buffer 30 which holds the current machine-level instruction. This instruction is decoded by a decoder circuit 31 to produce a microprogram start address pointing to a location in the lower microprogram store 21. This address is modified by a MODE bit from a mode register 32, having two values (FAST and SLOW). When MODE=- FAST, the third most significant bit of the microprogram start address is forced to zero, so that the address is in the first 2K locations of the microprogram store. When MODE=SLOW, the third bit is forced to 1, so that the address now points to the corresponding one of the next 2K locations. Thus, for any given machine-level instruction, one of two alternative start addresses is produced, according to the value of the MODE bit.

The sequencing logic also includes a multiplexer 33 controlled by a signal INT which indicates that an interrupt is pending. If no interrupt is pending (INT=0) the multiplexer selects the start address from the decoder 31; if an interrupt is pending, it selects a fixed address INTA which points to the start of an interrupt handling routine.

As shown in FIG. 2, the microprogram store 20 is addressed by a 14-bit address MPA from a microprogram address register 34. At each clock beat this register is updated with a new address from a multiplexer 35. This multiplexer has eight inputs 0–7 as follows:

Input 0: a fixed address VSIA which points to the start of a sequence for handling virtual store interrupts.

Input 1: this comes from a multiplexer 36 which selects the jump address JADD in the case of an absolute jump, or the output of an adder 37 in the case of a relative jump. The adder 37 forms the sum of the current microprogram address MPA and the jump address JADD.

Input 2 is a fixed address FASTERR which points to a sequence for handling fast error jumps (GFE).

Inputs 3 and 4 are not relevant to the present invention.

Input 5 is the microprogram start address MPSA from the multiplexer 33, which points to the first microinstruction in a sequence.

Input 6 is the jump address XA from the lower microprogram store extension, which points to the second microinstruction in the sequence.

Input 7 is obtained from an incrementer circuit 38 and is equal to MPA+1.

The multiplexer 35 is controlled by the output of a priority encoder circuit 39 having seven inputs 0–6, input 0 being the highest priority. It can be seen that, if one of the inputs of the encoder circuit 39 is enabled, the corresponding input of the multiplexer 35 is selected. If more than one input to the encoder circuit 39 is enabled, only the one with the higher priority is effective. If none of the inputs is enabled, the encoder circuit 39 produces the default value 7 which selects input 7 of the multiplexer 35.

The inputs to the priority encoder circuit 39 are as follows.

Input 0 is the virtual store interrupt signal VSI from the ATU 16.

Input 1 is the obeyed jump signal OBJMP from the condition logic 26.

Input 2 is the fast error jump signal GFE.

Inputs 3 and 4 are not relevant to this invention.

Input 5 is a signal STTSK which is produced when a microprogram sequence finishes, and indicates that the start address of the next sequence must be supplied.

Input 6 is a signal LMP which comes from a decoder 40 and indicates that the current microprogram address MPA is less than 4K, i.e. that the current microinstruction is in the lower microprogram store 21.

In summary, whenever a microprogram sequence finishes, the start address of the next sequence is supplied by MPSA. This will either be the start address derived from the current machine-level instruction or the interrupt address INTA. In either case, the address of the second microinstruction in the sequence is supplied by XA from the lower microprogram store extension 23. This will normally point to the upper microprogram store. Addresses for subsequent microinstructions in the upper microprogram store come from the incrementer 38 and hence are sequential. When a jump instruction is obeyed, the next microinstruction is at the address specified by JADD or, in the case of a fast error jump, by FASTERR. All the above possibilities are overriden by a virtual store interrupt.

FAST AND SLOW SEQUENCES

It was shown above that, in general, a machine-level instruction initiates one of two alternative microprogram sequences according to the state of the MODE Bit. The microprograms selected in the slow mode include tests to detect and resolve program errors or other exception conditions. The microprograms selected in the fast mode detect the exception condition but do not resolve them. As a result the fast microprogram sequences are generally considerably shorter, and hence faster, than the slow ones.

Figure 3:
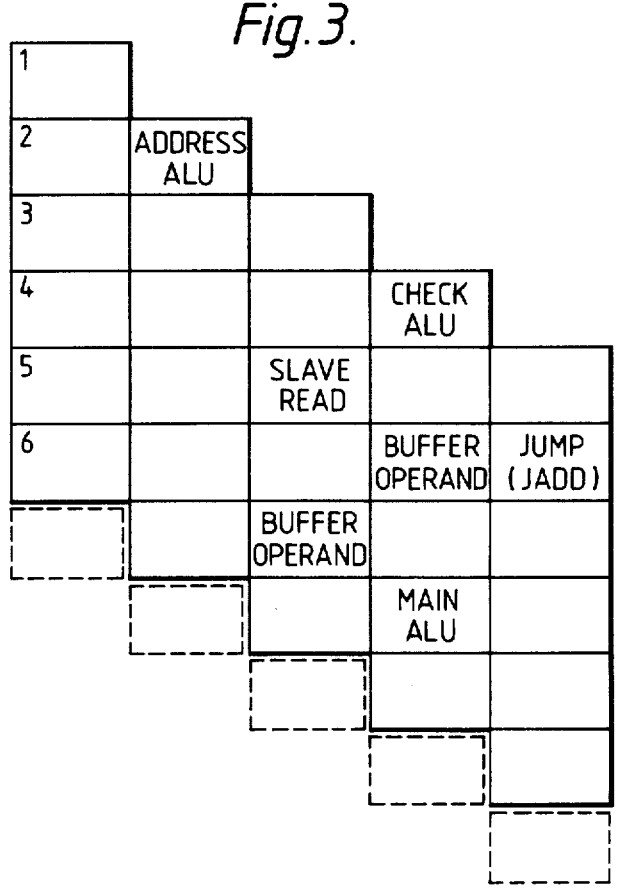
FIGS. 3 and 4 illustrate a slow microprogram sequence and the corresponding fast sequence.
Figure 4:
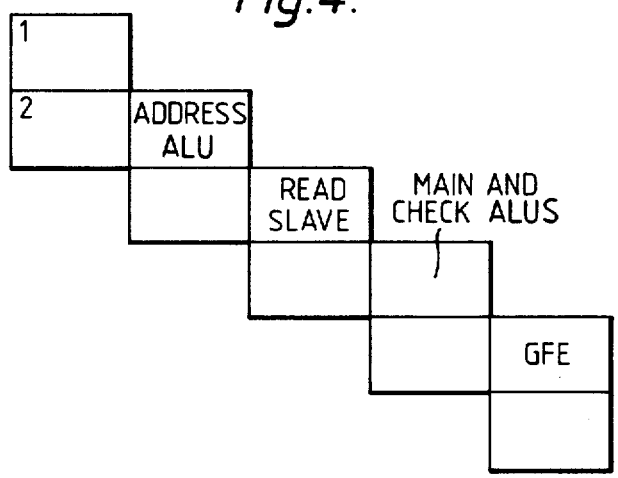

For example, consider a typical machine-level instruction which involves reading an operand and performing an operation on it. FIG. 3 shows the slow microprogram sequence for executing this instruction, and FIG. 4 shows the correspondinq fast sequence. In these figures, time is represented by the vertical axis, and the pipeline stage is represented by the horizontal axis. Hence, each microinstruction is represented by a diagonal row of boxes, sloping downwards from left to right.

As can be seen from FIG. 3, in the slow sequence the first microinstruction specifies an address mill operation to calculate the address of the operand and a check ALU operation to check the address (e.g. by comparing it with the contents of the stack front register SF). The next microinstruction is an absolute jump which is obeyed if the address check fails. The third microinstruction reads the operand from the slave store and buffers it in a temporary register. The fourth microinstruction is a null i.e. it performs no operations. The fifth microinstruction in the sequence buffers the operand from the slave store into the shifter, and then performs the required operation on the operand in the main ALU. The final microinstruction is another null. If the address check fails, the second microinstruction in the sequence causes a jump to another part of the sequence (not shown) which creates an interrupt parameter, specifying the exact nature of the error. An error handling routine is then initiated as will be described later.

It can be seen that in this sequence, the main ALU operation is not initiated until the second clock beat after the jump decision (in the last stage of the second microinstruction). This allows enough time to prevent the main ALU operation, and any main store activity resulting from the slave store action, from taking place if the jump is obeyed. Also, the next microprogram sequence (indicated by the broken lines) cannot start until after the jump decision has been made. Both these measures are necessary to ensure that, when an error condition is detected, it can be fully resolved.

Referring now to FIG. 4, the corresponding fast microprogram sequence consists of just two microinstructions. The first specifies the address ALU, main ALU and check ALU operations, and also the fast error jump GFE. The second is a null and is included because the minimum sequence length in the processor is two beats. As mentioned above, the fast error jump GFE does not require many bits to specify it, and hence can be included in the same microinstruction as the control fields for the address ALU, slave store, main ALU and check ALU.

It can be seen that the fast sequence is much shorter and hence faster than the slow sequence. Both sequences can detect a specified program error condition (e.g. address greater than stack front). The slow sequence also resolves this error by jumping to a specific sequence which forms a parameter indicating the exact nature of the error. In contrast, when the fast sequence detects an error, it simply jumps to the fast error address FASTERR which is common to all exception conditions. Thus, when the microprogram arrives at this address, it has no information about how it arrived there; it could have been as the result of any of a number of exception conditions. Thus, the fast sequence cannot resolve the error and it is necessary to roll-back the instruction and re-try it in the slow mode, as will be described.

As another example of a machine-level instruction, consider the case of a floating-point addition. The slow sequence for executing this instruction fetches the operands and tests them to ensure they are normalised. If they are not normalised, the sequence performs the necessary shifts to normalise them. Finally, the addition is performed. The slow sequence thus detects the exception condition (un-normalised operands) and also resolves it (by performing the normalisation). The fast sequence, on the other hand, fetches and adds the operands in parallel without testing them. Thus, it is not known until the end of the sequence whether the operands are normalised, by which time the addition has already been performed. This again causes a jump to the fast error address, and the instruction will be re-tried in slow mode.

OPERATION

Referring now to FIG. 5, this is a flow chart showing the overall structure of the microprogram. It is assumed that initially the mode bit is set so that MODE=FAST.

The execution of each machine-level instruction starts at box 50. Assuming that there are no interrupts pending, this initiates the fast microprogram sequence (box 51) for executing the instruction. If there are no exceptions, the instruction is executed very rapidly, and the microprogram returns to box 50, i.e. the start of the next machine level instruction.

However, if an exception is detected, the microprogram jumps to the fast error address FASTERR (box 52). This sets the interrupt parameter to zero, and jumps to an error handling routine (box 53). The error handling routine is a roll-back routine which restores the processor to its state at the start of the machine-level instruction in question. For example, it replaces the machine registers with copies which were preserved in the local registers 13 at the beginning of the instruction. The error routine then sets the MODE bit to SLOW, and produces a delayed interrupt signal DINT.

The microprogram then returns to box 50. Since the interrupt signal DINT generated at box 53 was a delayed interrupt, it is not yet effective and so the microprogram starts to execute the instruction again, using the corresponding slow sequence (box 54).

The slow sequence tests for program errors. If no program errors are detected, it then executes the instruction, and returns to box 50. The delayed interrupt DINT previously generated at box 53 is now active, and causes the microprogram to jump to an interrupt routine (box 55). Since the interrupt parameter is zero, this routine simply sets the MODE bit back to FAST and returns to box 50. Operation then continues in fast mode.

If, on the other hand, the slow sequence (box 54) detects a program error, it creates an interrupt parameter specifying the exact nature of the error, and then jumps to the error routine (box 53). As before, this routine rolls back the instruction to its initial state. This time, since MODE=SLOW, it produces a non-delayed interrupt signal INT. Now, when the microprogram returns to box 50, the interrupt is active, and causes a jump to the interrupt routine (box 55). As before, the interrupt routine resets the MODE bit back to FAST. The interrupt routine then examines the interrupt parameter (created by the slow sequence) and performs the appropriate actions for dealing with the program error. The microprogram then returns to box 50 so as to begin the next instruction.

VIRTUAL STORE INTERRUPTS

As described above, a VSI causes the microprogram to jump immediately to the start of a VSI sequence (box 56). This creates a special VSI parameter and then jumps to the error routine (box 53) which rolls back the instruction.

If MODE=FAST, the error routine sets the mode to SLOW, and generates a delayed interrupt DINT. The microprogram then returns to box 50. Since DINT is not yet active, no interrupt is produced, and the microprogram proceeds to retry the instruction using the corresponding SLOW sequence (box 54). The VSI will occur again during this slow sequence, when it attempts to access the operand again, causing another jump to box 56.

Once again, the VSI sequence creates the VSI parameter, and jumps to the error routine, which again rolls back the instruction. This time, since MODE=SLOW, the error routine produces a non-delayed interrupt INT. Thus, when the microprogram returns to box 50, the interrupt is active, and causes a jump to the interrupt routine (box 55). This resets the mode to FAST, and examines the interrupt parameter to find that this is a VSI. The interrupt routine therefore takes the appropriate action to deal with the VSI (i.e. loading the appropriate address translation information into the ATU), before returning to box 50.

Thus, it can be seen that when a VSI is encountered in FAST mode, it is ignored and the instruction is rolled back and tried again in SLOW mode, before attempting to handling the VSI. This avoids difficulties in handling VSI's generated in FAST mode.

I claim:

1. Data processing apparatus comprising:
   (a) microprogram store,
   (b) execution means connected to the microprogram store for executing machine-level instructions by means of sequences of microinstructions held in the microprogram store, at least some of the machine-level instructions having alternative fast and slow microprogram sequences, the fast sequences being effective to detect exception conditions without resolving them and the slow sequences being effective both to detect and to resolve exception conditions,
   (c) mode selection means for selecting either a fast mode or a slow mode, (d) means connected to the mode selection means and to the execution means, for selecting a fast microprogram sequence to execute a machine-level instruction when the fast mode is selected, and for selecting the alternative slow microprogram sequence when the slow mode is selected, (e) means connected to the execution means and to the mode selection means, and operative upon detection of an exception condition during a fast sequence, for causing the machine-level instruction currently being executed to be abandoned, the mode selection means to be set to select the slow mode, and the machine-level instruction then to be re-started, and (f) means connected to the execution means and to the mode selection means, and operative upon completion of a slow sequence, for setting the mode selection means to select the fast mode.

2. Apparatus according to claim 1 wherein the microinstructions are stored in compressed form, the apparatus including decoder means connected to the microprogram store for decompressing each microinstruction to produce control signals for the apparatus.

3. Apparatus according to claim 1 wherein the execution means comprises a plurality of processing stages connected together in series to form forming a pipeline for executing successive microinstructions in an overlapped manner.

4. Apparatus according to claim 1 including means connected to the execution means and operative upon detection of an exception condition during a fast sequence to perform a microprogram jump to a predetermined microprogram address for all exception conditions.

5. Apparatus according to claim 1 including means connected to the execution means and operative upon detection of an exception condition during a slow sequence for initiating a microprogram jump to a microprogram address specific to that exception condition.

6. Apparatus according to claim 1 including an instruction decoder connected to the execution means for decoding a machine-level instruction to produce a microprogram start address, and means connected to the instruction decoder and to the mode selection means, for modifying the microprogram start address so as to produce one of two different values corresponding to the start address for the fast and slow microprogram sequences for that instruction.

7. Apparatus according to claim 6, including a microprogram address register connected to the microprogram store, for addressing the microprogram store, and a multiplexer connected to the microprogram address register for selecting a next microprogram address to be loaded into the microprogram address register from one of the following sources:

(a) the start address produced by the decoder, (b) an output of an adder circuit which increments the microprogram address register, and (c) a predetermined address which points to the start of a microprogram sequence for handling exception conditions occurring during a fast sequence.

8. Data processing apparatus comprising:

(a) first means for performing a plurality of fast microprogram sequences to execute a plurality of machine-level instructions, the fast sequences being effective to detect exception conditions without resolving them, and (b) means connected to said first means, and operative upon detection of an exception condition during one of the fast microprogram sequences, for causing the machine-level instruction currently being executed to be abandoned and then to be re-tried using an alternative slow microprogram sequence which is effective both to detect and to resolve exception conditions.

9. A method of operating a microprogrammed data processing system, comprising:

(a) performing a plurality of fast microprogram sequences to execute a plurality of machine-level instructions, the fast sequences being effective to detect exception conditions without resolving them, and (b) upon detection of an exception condition during one of the fast microprogram sequences, abandoning the execution of the machine-level instruction currently being executed and re-trying that instruction using an alternative slow microprogram sequence which is effective both to detect and to resolve exception conditions.

* * * * *